Patented Nov. 16, 1937

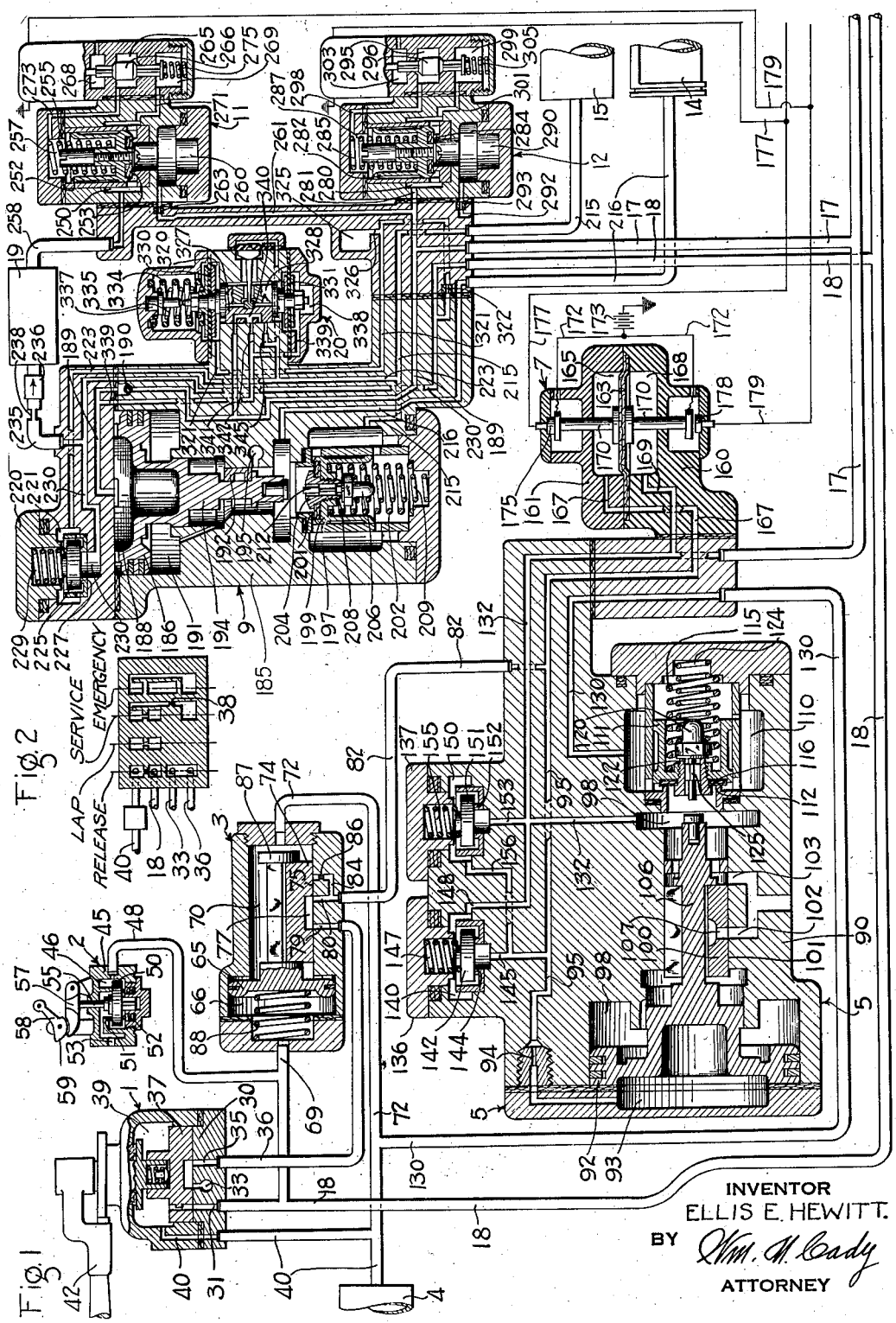

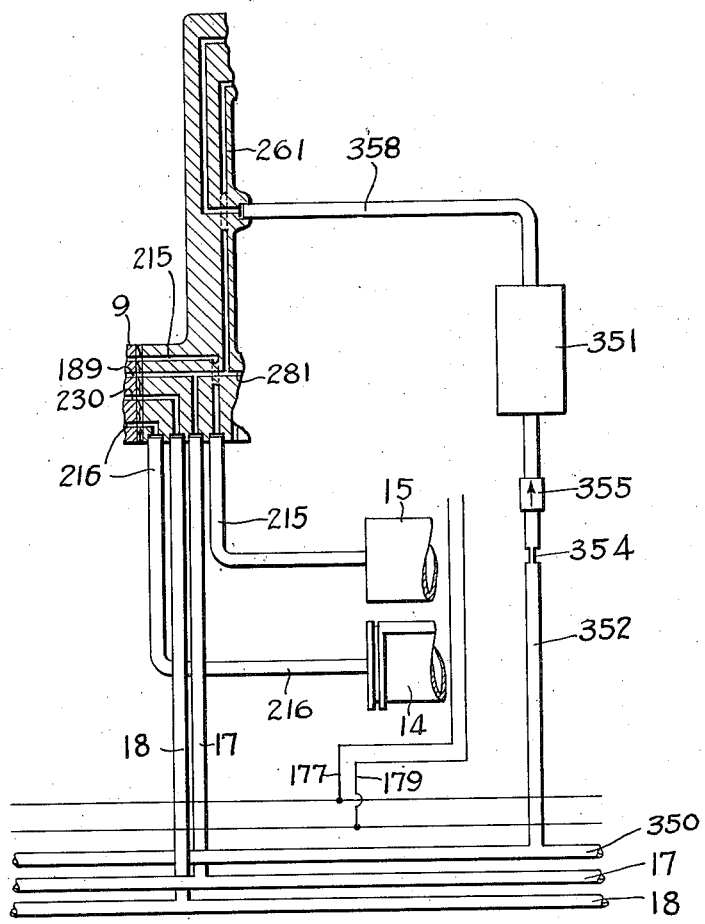

2,099,396

UNITED STATES PATENT OFFICE 2,099,396

FLUID PRESSURE BRAKE

Ellis E. Hewitt, Edgewood, Pa., assignor to The Westinghouse Air Brake Company, Wilmerding, Pa., a corporation of Pennsylvania Application August 24, 1935, Serial No. 37,700

17 Claims. (Cl. 303—15)

This invention relates to electropneumatic brakes and more particularly to a braking system in which the brakes may be controlled both electrically and pneumatically.

Braking systems have heretofore been developed which employ a brake pipe to supply fluid under pressure to reservoirs from which fluid is supplied to the vehicle brake cylinders to effect an application of the brakes. In these systems the supply of fluid under pressure to the brake cylinders from the reservoirs and the release of fluid under pressure from the brake cylinders, is controlled by means of relay valve devices carried by each of the cars of a train and controlled by variations in the pressure of the fluid in a control pipe.

In these systems the pressure of the fluid in the control pipe is controlled by means of an engineer's brake valve, which controls the supply and release of fluid under pressure to and from the control pipe, either directly or through a relay valve, together with electrically operated means which controls the supply of fluid to the control pipe from the reservoirs on the cars, the supply and release of fluid under pressure to and from the control pipe being effected through magnet valves mounted on the cars.

There is a possibility in the event of improper operation of the magnet valves, or a rupture of the control pipe, that all of the air will be released from the reservoirs, with the result that no fluid under pressure will be available to effect an application of the brakes.

It is a principal object of the present invention to provide a braking system of the type described, and in which the electrically operated means supplies fluid under pressure to the relay valve device and to the control pipe from a source other than the reservoirs from which fluid is supplied to the brake cylinders, whereby the possibility of a complete loss of fluid to effect an application of the brakes as a result of improper operation of the magnet valves or a rupture of the control pipe is eliminated.

Other objects of the invention and features of novelty will be apparent from the following description taken in connection with the accompanying drawings, in which—

Fig. 1 is a diagrammatic view, largely in section, of one form of braking system embodying my invention;

Fig. 2 is a diagrammatic development of the manual control means employed in the system shown in Fig. 1; and Fig. 3 is a fragmentary diagrammatic view of a modified form of braking system embodying my invention.

Referring to Fig. 1 of the drawings the system therein illustrated includes an engineer's brake valve 1, a conductor's brake valve 2, a fluid pressure operated valve device 3, a main reservoir 4, a relay valve device 5, a fluid pressure operated switch device 7, a relay valve device 9, an application magnet valve device 11, a release magnet valve device 12, a brake cylinder 14, a supply reservoir 15, a control pipe 17, a brake pipe 18, a control reservoir 19, and a change-over valve device 20.

The engineer's brake valve 1 comprises a body having a rotary valve seat 30, having therein a port 31 communicating with the brake pipe 18, an atmospheric exhaust port 33, and a port 35 which communicates with a pipe 36 which leads to the fluid pressure operated valve device 3.

The engineer's brake valve 1 has a rotary valve 37 mounted in a chamber therein, the rotary valve having ports formed therein adapted in different positions of the rotary valve, as will hereinafter more fully appear, to establish communication between the chamber 39, above the rotary valve and which is constantly connected to the main reservoir 4 by way of the passage and pipe 40, and the brake pipe 18, and the pipe 36, or between the brake pipe, the pipe 36 and the atmospheric exhaust port 33. The rotary valve 37 is adapted to be operated between its different positions by means of a manual operating handle 42.

The conductor's brake valve 2 comprises a casing indicated generally by the reference numeral 45, and having a chamber 46 therein which is constantly connected to the brake pipe 18 by way of a pipe 48. A valve element 50 is mounted in the chamber 46 and is normally urged into engagement with a seat rib 51 by means of a spring 52 so as to cut off communication between the chamber 46 and the atmosphere by way of a passage 53. The valve element 50 has a stem 55 associated therewith which is adapted to be engaged by a lever 57, which is operated by means of a lever 58 having a cam portion 59 engageable with the lever 57.

When the lever 58 is rotated the cam surface 59 engages the lever 57 so as to move the lever 57 downwardly and it presses on the stem 55, so as to move the valve 50 away from the seat 51, and thereby establish communication between the chamber 46 and the atmosphere by way of the passage 53.

The fluid pressure operated valve device 3 comprises a casing having a bore therein in which is mounted a piston 65 having a chamber 66 at one side thereof connected to the brake pipe 18 by way of a pipe 69. The piston 65 has a valve chamber 70 on the opposite side thereof which is constantly connected to the main reservoir 4 by way of a pipe 72. A slide valve 74 is positioned in the valve chamber 70 and is slidable upon a seat 75 and has a cavity 77 therein which controls communication between a port 79, to which is connected the pipe 36 leading from the engineer's brake valve 1, and a port 80 which is connected by way of a pipe 82 with a passage in the relay valve device 5. The body of the fluid pressure operated valve device 3 also has a passage 84 formed therein which has a restricted portion 86 interposed therein, the passage 84 communicating with a port in the valve seat which is adapted to be uncovered by the end of the slide valve 74 in one position of the slide valve.

The slide valve 74 is operated by means of a stem 87 associated with the piston 65, while the piston 65 is normally urged to the right, as viewed in the drawings, by means of a spring 88.

The relay valve device 5 comprises a body indicated generally by the reference numeral 90 and having a bore therein in which is located a piston 92 having on one side thereof a chamber 93 which is connected through a restricted passage 94 with a passage 95 to which is connected the pipe 82.

The piston 92 has on the other side thereof a valve chamber 98 in which is mounted a slide valve 100 which is slidable upon a seat 101 formed in the body 90, and this seat has a pair of ports 102 and 103 formed therein and communicating with the atmosphere. The slide valve 100 is adapted to be operated by a stem 106, which is formed integral with the piston 92, while the slide valve 100 has a port 107 extending therethrough and adapted in one position of the slide valve 100 to be substantially in alignment with the port 102 in the slide valve seat 101.

The body 90, in addition, has a valve chamber 110 formed therein in which is mounted a valve 111, which is normally urged into engagement with a seat rib 112 by means of a spring 115. The valve 111 has associated therewith a member 116 which is adapted to be engaged by the end of the stem 106.

The valve 111 also has associated therewith a pilot valve device comprising a valve element 120, which is normally urged by means of a spring 124 into engagement with a seat rib 122 formed on the member 116. The valve element 120 has a stem 125 associated therewith which is positioned in a bore in the member 116, and which projects from the face of the member 116 so as to be engaged by the end of the stem 106 before the member 116 is engaged thereby.

The valve chamber 110 is constantly connected with the main reservoir 4 by way of a pipe and passage 130, while the valve chamber 98 is constantly connected with the control pipe 17 by way of a passage 132.

The relay valve device 5 has a pair of check valve devices associated therewith and indicated generally by the reference numerals 136 and 137. The check valve device 136 is adapted to permit flow from the passage 95 in the body 90 to the passage 132, and to cut off flow between the passage 132 and the passage 95, while the check valve device 137 is adapted to permit flow between the passage 132 and the passage 95, and to cut off flow between the passage 95 and the passage 132.

The check valve device 136 comprises a chamber 140 in which is mounted a valve element 142, and which is urged by a spring 147 into engagement with a seat rib 144 surrounding a passage 145 which communicates with the passage 95. On a predetermined increase in the pressure of the fluid in the passage 95 over that in the passage 132, the valve 142 will be lifted off from the seat rib 144 by the pressure of the fluid in the passage 145 acting on the face of the valve 142 within the seat rib 144, and fluid will thereupon flow from the passage 95 to the chamber 140 and therefrom by way of a passage 148 to the passage 132.

The check valve device 137 is similar in construction to the check valve device 136, and comprises a chamber 150 in which is mounted a valve element 151 which is normally urged by a spring 155 into engagement with a seat rib 152 surrounding a passage 153 leading from the passage 132. The chamber 150 is connected to the passage 95 by way of a passage 156, and on an increase in the pressure of the fluid in the passage 132, the fluid in the passage 153 acting on the face of the valve 151 within the seat rib 152 will cause the valve element 151 to be moved away from the seat rib 152 so as to permit fluid to flow from the passage 132 to the chamber 150 and therefrom by way of the passage 156 to the passage 95.

The relay valve device 5 has associated therewith the fluid pressure operated switch device 7, which, as shown, comprises a pair of housing sections 160 and 161, which have clamped therebetween the diaphragm 163, which has on one side thereof a chamber 165, which is constantly connected to the passage 95 by way of a passage 167, and which has on the other side thereof a chamber 168 which is constantly connected to the control pipe 17 by way of a passage 169.

The diaphragm 163 has operatively connected thereto a stem 170 which is connected by means of wires 172 to one side of a source of current, such as a battery 173, the other side of which is connected to ground.

The housing section 161 of the fluid pressure operated switch device 7 has mounted thereon adjacent the end of the stem 170 a contact 175 which is connected by way of a wire 177 with the winding of the release magnet valve device 12. In addition, the housing section 160 of the fluid pressure operated switch device 7 has mounted thereon a contact 178 which is connected by way of a wire 179 with the winding of the application magnet valve device 11. The stem 170 is adapted in one position of the diaphragm 163 to engage the contact 175 to complete a circuit through this contact from the battery 173, and in another position of the diaphragm 163 to engage the contact 178 and establish a circuit through this contact from the battery 173.

The diaphragm 163 is constructed so as to normally maintain the stem 170 in engagement with the contact 175 and thus maintain a circuit through the winding of the release magnet valve device 12.

The relay valve device 9 comprises a body 185 having a bore therein in which is mounted a piston 186 having a chamber 188 on one side thereof which is connected with the control pipe 17 by way of a passage 189, having a check valve 190 interposed therein.

The piston 186 has on the opposite side thereof a slide valve chamber 191, in which is mounted a slide valve 192 which is adapted to be operated by means of a stem 194 associated with the piston 186, and which controls communication between the chamber 191 and the atmosphere by way of a passage 195.

The body 185, in addition, has a valve chamber 197 formed therein in which is mounted a valve element 199 which is normally urged into engagement with a seat rib 201 by means of a spring 202 so as to cut off communication between the valve chamber 197 and the slide valve chamber 191.

The valve element 199 has a member 204 associated therewith and adapted to be engaged by the end of the stem 194.

The valve 199, in addition, has associated therewith a pilot valve comprising a valve element 206 which is normally urged into engagement with a seat rib 208 on the member 204 by means of a spring 209, and which has associated therewith a stem 212 positioned in a bore extending through the member 204, the stem 212 projecting from the face of the member 204 so as to be engaged by the end of the piston stem 194 before the member 204 is engaged thereby.

The valve chamber 197 is constantly connected with the supply reservoir 15 by way of a passage and pipe 215, while the slide valve chamber 191 is constantly connected with the brake cylinder 14 by way of a pipe and passage 216.

The relay valve device 9 has associated therewith a check valve device indicated generally by the reference character 220, and comprising a chamber 221, which is constantly connected with the supply reservoir 15 by way of a passage 223 and the passage 215, and this chamber has positioned therein a valve element 225 which is normally urged into engagement with a seat rib 227 by means of a spring 229, while the area within the seat rib 227 is constantly connected to the brake pipe 17 by way of a passage 230.

The control reservoir 19 is connected to the passage 230, and thereby to the brake pipe 18, by way of a pipe 235 having a check valve 236 interposed therein, and adapted to permit fluid to flow from the passage 230 to the control reservoir 19, and to cut off the flow of fluid from the control reservoir 19 to the passage 230. The pipe 235 also has a restricted portion or choke 239 interposed therein and adapted to restrict the rate of flow of fluid from the brake pipe 18 to the control reservoir 19.

The application magnet valve 11 comprises a casing having a chamber 250 therein in which is mounted a valve element 252 which is normally urged into engagement with a seat rib 253 by means of a spring 255, and by the pressure of the fluid in a chamber 257 on the upper side of the valve element 252.

The valve element 252 is urged away from the seat rib 253 by the pressure of the fluid in the chamber 250 acting on the face of the valve element 252 outwardly of the seat rib 253. The valve element 252 controls communication between the chamber 250, which is constantly connected to the control reservoir 19 by way of a pipe and passage 258, and a chamber 260 which is constantly connected to the control pipe 17 and the chamber 188 of the relay valve device 9 by way of a passage 261 which has a choke or restricted portion 263 interposed therein.

The application magnet valve device also includes a casing section having a chamber 265 formed therein in which is mounted a double beat valve element 266 which controls communication between the chamber 265 and a chamber 268 and a chamber 269. The chamber 268 is constantly connected to the atmosphere, while the chamber 269 is constantly connected to the chamber 250 by way of a passage 271. The chamber 265 is constantly connected to the chamber 257 on the upper side of the valve element 252 by means of a passage 273.

The valve element 266 is normally held in engagement with its upper seat by means of a spring 275 so as to cut off communication between the chamber 265 and chamber 268, and is urged downwardly against this spring to its lower seated position by the winding of the magnet valve device on energization thereof so as to cut off communication between the chamber 265 and the chamber 269.

The release magnet valve device 12 comprises a casing having a chamber 280 therein which communicates by way of a passage 281 with the passage 261 which communicates with the control pipe 17, and the chamber 280 has mounted therein a valve element 282 which is normally held in engagement with a seat rib 284 by means of a spring 285 and by the pressure of the fluid in a chamber 287 on the upper side of the valve element 282.

The valve element 282 controls communication between the chamber 280 and thereby the control pipe 17, and a chamber 290 which is constantly connected to the atmosphere by way of a passage 292 having a restricted portion 293 interposed therein.

The release magnet valve device 12 also includes a casing section having a chamber 295 formed therein in which is mounted a double beat valve element 296. The chamber 295 is in constant communication with the chamber 287 on the upper side of the valve element 282 by means of a passage 298, while the valve 296 is adapted to control communication between the chamber 295 and a chamber 299, which is constantly connected with the chamber 280 by way of a passage 301, and a chamber 303 which is constantly connected to the atmosphere.

The double beat valve element 296 is urged to its upper seated position by means of a spring 305 so as to cut off communication between the chamber 295 and the chamber 303, and is moved to its lower seated position, as shown in the drawings, on energization of the winding of the magnet valve device so as to cut off communication between the chamber 295 and the chamber 299.

The change-over valve device 20 comprises a casing having a valve chamber 320, which is connected to the brake pipe 18 by way of a passage 321, which has a choke 322 interposed therein, and by way of the passage 230. The passage 321 also communicates with a pressure chamber 325 by way of a passage 326.

The valve chamber 320 contains a slide valve 327 which is controlled by a stem 328 which has secured thereto the diaphragms 330 and 331, which diaphragms are of unequal diameter, the diaphragm 330 being substantially larger in diameter than the diaphragm 331.

The diaphragm 330 is subject on one side to the pressure of the fluid in the valve chamber 320, and is subject on the other side to the pressure of the springs 334 and 335.

A stop 337 is provided which engages the end of the stem 328 to limit upward movement of the stem 328, while the end of the stem 328 engages the wall of the chamber 338 to limit downward movement thereof.

The diaphragm 331 is subject on one side to the pressure of the fluid in the valve chamber 320, and is subject on the other side to the pressure of the fluid in chamber 338, which communicates by way of the passage 339 with the chamber 188 in the relay valve device 9.

The stem 328, therefore, is moved upwardly by the pressure of the fluid in the valve chamber 320 acting on the lower face of the diaphragm 330, and by the pressure of the fluid in the chamber 338 acting on the lower face of the diaphragm 331, and is urged downwardly by the pressure of the fluid in the valve chamber 320 acting upon the upper side of the diaphragm 331 and by the springs 334 and 335.

The slide valve 327 has a port 340 formed therein and controls communication between the passage 341, which communicates with the control passage 189 on the side of the check valve 190 remote from the relay valve device, and the passage 342 which communicates by way of the passage 339 with the chamber 188 in the relay valve device 9.

The slide valve 327 also controls communication between the passage 345, which communicates with the supply reservoir 15 by way of the passage 223, and the passage 342 which communicates with the chamber 188 in the relay valve device.

The port 340 in the slide valve 327 is arranged so that when the stem 328 is in the upper position communication is established between the passages 341 and 342, and communication is cut off between the passages 345 and 342, while in the lower position of the stem 328 communication is cut off between passages 341 and 342 and is established between the passages 342 and 345. The port 340 is also arranged so that in an intermediate position of the stem 328 communication is cut off between the passage 342 and both of the passages 341 and 345. This is the lap position of the change-over valve device.

The details of construction of the change-over valve device 20 form no part of the present invention, and this valve device is described and claimed in my application Serial No. 31,224 for a patent on brake control valves, filed July 13, 1935.

In the installation of a system of this type on a train, the engineer's brake valve 1, the conductor's brake valve 2, the fluid pressure operated valve device 3, the main reservoir 4, the relay valve device 5, and the fluid pressure operated switch device 7 are mounted on the engine, and each of the cars of the train is provided with a relay valve device 9, an application magnet valve device 11, a release magnet valve device 12, a brake cylinder 14, a supply reservoir 15, a control reservoir 19, and a change-over valve device 20, while the control pipe 17 and the brake pipe 18 extend throughout the entire length of the train, the connections between the cars being made by means of flexible couplings. A conductor's brake valve 2 may also be installed on each of the cars of the train. In addition, the wires 177 and 179 extend throughout the length of the train.

In the operation of the system, assuming that the main reservoir 4 is charged with fluid under pressure and that the operating handle 42 of the engineer's brake valve device 1 is turned to the release position, fluid will flow from the main reservoir by way of the pipe and passage 40 to the chamber 39 in the engineer's brake valve device, and therefrom by way of a passage in the rotary valve 37 to the port 31 and the brake pipe 18. If desired the pressure of the fluid supplied from the main reservoir may be reduced by means of a feed valve (not shown). Fluid which is supplied to the brake pipe 18 flows therethrough to the relay valve device 9, and the fluid which is supplied to the passage 230 in the relay valve device flows by way of the pipe 235 and the choke 238 and through the check valve 236 to the control reservoir 19 charging said reservoir. Fluid supplied to the control reservoir 19 flows therefrom by way of the pipe 258 to the chamber 250 of the application magnet valve device 11 and from this chamber fluid flows by way of the passage 271 to the chamber 269. Fluid supplied to the chamber 269 flows past the double beat valve 266 to the chamber 265 and therefrom by way of the passage 273 to the chamber 257 on the spring side of the valve 252 where it acts upon the valve 252 to maintain it seated on the seat rib 253. In addition, fluid which is supplied to the passage 230 unseats the valve element 225 so that fluid flows to the chamber 221 in the check valve 220 and therefrom by way of the passage 223 to the supply reservoir 15 charging this reservoir with fluid under pressure.

Fluid which is supplied to the brake pipe 18 also flows by way of the pipe 69 to the chamber 66 in the fluid pressure operated valve device 3, while fluid under pressure from the main reservoir 4 flows by way of the pipe 72 to the valve chamber 70 on the opposite side of the piston 65 of the valve device 3, and as the pressures on the opposite sides of said piston 65 are substantially equal, the piston will be moved to the position in which it is shown in the drawings by means of the spring 88, in which position the slide valve 74 cuts off communication through the port 84, while the cavity 77 establishes communication between the ports 79 and 80.

Fluid which is supplied to the brake pipe 18 also flows by way of the choke 322 and the passages 321 and 326 to the pressure chamber 325, and by way of the passage 321 to the valve chamber 320 in the change-over valve device 20, where the fluid under pressure acting on the differential areas of the diaphragms 330 and 331 moves the stem 328 and the slide valve 327 to the position in which they are shown in the drawings, in which position the port 340 in the slide valve establishes communication between the passages 341 and 342, with the result that control pipe 17 is connected to the chamber 188 of the relay valve device 9 by way of the passage 339 which by-passes the check valve 190. This permits fluid to be released from the chamber 188 through the control pipe 17.

Fluid also flows from the main reservoir 4 by way of the pipe 130 to the chamber 110 in the relay valve device 5, while fluid from the brake pipe 18 flows by way of the pipe 48 to the chamber 46 in the conductor's brake valve 2.

When it is desired to effect an application of the brakes the operating handle 42 of the engineer's brake valve 1 is turned to the service position, in which position communication is maintained between the chamber 39, which is connected to the main reservoir, and the brake pipe 18, as is clearly shown in Fig. 2 of the drawings, which is a diagrammatic view of the ports in the engineer's brake valve. When the operating handle 42 is turned to the service position a communication is established between the chamber 39 and the port 35 which has the pipe 36 connected thereto, the communication being by way of a choke or restricted portion 38 to limit the rate of flow of fluid from the main reservoir to the pipe 36.

Fluid which is supplied to the pipe 36 flows therethrough to the port 79 in the fluid pressure operated valve device 3, and therefrom by way of the cavity 77 in the slide valve 74 to the port 80 and thence by way of the pipe 82 to the passage 95 in the relay valve device 5.

Fluid which is supplied to the passage 95 flows therefrom to the passage 167 in the fluid pressure operated switch device 7 and thence to the chamber 165, where it forces the diaphragm 163 downwardly and moves the stem 170 out of engagement with the contact 175, thereby interrupting the circuit through the winding of the release magnet valve 12, and into engagement with the contact 178. When the stem 170 engages the contact 178 a circuit is established which includes the battery 173, the wire 172, the contact 178, and the wire 179 which is connected to one side of the winding of the application magnet valve device 11, the other side of which is connected to ground.

Upon energization of the winding of the application magnet valve device 11 the double beat valve element 266 is forced downwardly against the spring 275 so as to cut off communication between the chamber 269 and the chamber 265, and to establish communication between the chamber 265 and the atmosphere by way of the chamber 268. This permits fluid to escape from the chamber 267, on the upper side of the valve element 252, to the atmosphere, and on the release of this fluid under pressure, the fluid in the chamber 250 acting on the portion of the valve element 252 outwardly of the seat rib 253 forces this valve element upwardly so as to permit fluid to flow from the chamber 250 to the chamber 260, and therefrom through the restricted passage 263 and the passage 261 to the control pipe 17 and the passage 189 in the relay valve device 9 which leads to the chamber 188 of the relay valve device.

Fluid supplied to the passage 189 and to the control pipe 17 by the application magnet valve device 11, or by any other means, also flows by way of the passage 281 to the chamber 280 in the release magnet valve device 12, and therefrom by way of the passage 301 to the chamber 299. Fluid supplied to the chamber 299 flows past the double beat valve 296 which is in its upper seated position at this time, to the chamber 295 and therefrom by way of the passage 298 to the chamber 287 on the spring side of the valve 282, where it acts upon the valve 282 and serves to maintain the valve in engagement with the seat rib 284.

The fluid which is supplied to the passage 95 in the relay valve device 5 also flows by way of this passage and the restricted portion 94 to the chamber 93 on the left hand side of the piston 92, and forces this piston to the right as viewed in Fig. 1 of the drawings, and after a certain amount of movement of the piston 92, the stem 106 engages the end of the slide valve 100 and moves it to the right so as to cut off communication through the ports 102 and 103.

On further movement of the piston 92 the end of the stem 106 engages the end of the stem 125 of the pilot valve element 120 so as to move this valve element away from the seat rib 122 against the spring 124. This permits fluid to flow from the chamber 110 to the valve chamber 98 at a slow rate so as to permit the pressures in these chambers to approach equalization and thus reduce the force exerted by the fluid in the chamber 110 acting on the valve element 111 and tending to hold the valve element against the seat rib 112.

On further movement of the piston 92 the stem 106 will engage the member 116 and the valve 111 will be forced away from the seat 112 against the spring 115 and fluid will thereupon flow at a more rapid rate from the chamber 110, which is connected to the main reservoir 4, to the valve chamber 98, which is connected by way of the passage 132 to the control pipe 17.

The fluid which is supplied to the passage 95 also flows by way of the passage 145 to the chamber on the lower side of the valve element 142 of the check valve device 136 and, on a predetermined increase in the pressure of the fluid in the pipe 95, the valve element 142 will be moved away from the seat rib 144 against the spring 147, and fluid will thereupon flow from the passage 95 to the chamber 140 which is connected by way of the passage 148 to the passage 132 which leads to the control pipe 17.

It will be seen, therefore, that on movement of the handle 42 of the engineer's brake valve 1 to the service position fluid may be supplied to the control pipe from a plurality of sources, one of these being by way of the application magnet valve device 11, another being by operation of the relay valve device 5, and another being by the supply of fluid to the passage 132 directly from the engineer's brake valve by way of the pipe 82 and passage 95.

On an increase in the pressure of the fluid in the control pipe 17 the pressure of the fluid in the chamber 188 in the relay valve device 9 will be increased, and the piston 186 will be forced downwardly so that the end of the piston stem 194 engages the stem 212 of the pilot valve 206 causing the pilot valve 206 to be forced away from the seat rib 208 against the spring 209. In addition the slide valve 192 will be moved to a position to cut off communication through the passage 195.

Thereupon fluid will flow at a slow rate from the valve chamber 197, which is constantly connected to the supply reservoir 15 by way of the passage and pipe 215, to the slide valve chamber 191, which is connected to the brake cylinder 14 by way of the pipe and passage 216.

When the pilot valve 206 is unseated the pressures in the valve chamber 197 and in the slide valve chamber 191 will tend to equalize, thus reducing the force exerted by the fluid under pressure in the chamber 197 and tending to hold the valve 199 against the seat rib 201. Thereafter, on further movement of the piston 186 downwardly, the valve 199 will be moved away from the seat rib 201 against the spring 202, and fluid will flow from the valve chamber 197 to the slide valve chamber 191 and therefrom to the brake cylinder 14 at a more rapid rate.

On an increase in the pressure of the fluid in the control pipe 17 there will be a similar increase in the pressure of the fluid in the chamber 168 of the fluid pressure operated switch device 7 which is connected to the control pipe 17 by way of a passage 169, and when this pressure increases to a value substantially equal to that in the chamber 165 the diaphragm 163 will be moved upwardly so as to move the stem 170 to the lap position, in which position the stem is out of engagement with the contact 178 and the contact 175, so that the circuits to both the application magnet valve device 11 and the release magnet valve device 12 are interrupted. This cuts off the supply of fluid to the control pipe 17 by means of the application magnet valve device 11.

Similarly, assuming that the handle 42 of the engineer's brake valve has been moved from the service position to the lap position, which results in the cutting off of the flow of fluid from the main reservoir to the pipe 36 and therefrom to the passage 95, the supply of fluid to the chamber 93 will be cut off, and, as soon as the pressure in the valve chamber 98 increases to a value substantially equal to that in the chamber 93, the piston 92 will be moved to the left and the stem 106 will move the slide valve 100 to the lap position, while the stem 106 will move out of engagement with the member 116 and the stem 125 of the pilot valve 120 so as to permit the valve 111 and the pilot valve 120 to seat and cut off the supply of fluid to the valve chamber 98 and to the passage 132 from the main reservoir.

Likewise, when the supply of fluid under pressure to the pipe 36 is cut off, the supply of fluid to the passage 95 will be cut off, and fluid can no longer flow from the passage 95 past the check valve 136 to the passage 132.

It will be seen, therefore, that when the handle 42 of the engineer's brake valve 1 is turned to the lap position, after having been moved to service position, the relay valve device 5 will operate to cut off the supply of fluid under pressure to the control pipe 17 by the valve device as soon as the pressure in the control pipe 17 increases to a value substantially equal to that established by operation of the engineer's brake valve 1 in the pipe 82 leading to the relay valve device.

Similarly the fluid pressure operated switch device 7 will operate to cut off the supply of fluid to the control pipe 17 by operation of the application magnet valve device 11 as soon as the pressure of the fluid in the control pipe 17 increases to a value substantially equal to that supplied to the fluid pressure operated switch device 7 by operation of the engineer's brake valve 1.

The relay valve device 9 will operate to supply fluid under pressure to the brake cylinder 14 until the pressure established therein and in the valve chamber 191 is substantially equal to that in the chamber 188 on the opposite side of the relay valve device piston 186, whereupon the piston 186 will be moved upwardly to the lap position, in which position the stem 194 is moved out of engagement with the member 204, and the stem 212 associated with the pilot valve 206, while the slide valve 192 laps the exhaust port 195.

If it is desired to increase the degree of application of the brakes the handle 42 of the engineer's brake valve is turned to the service position so as to again supply fluid under pressure to the pipe 36 and therefrom to the pipe 82 which leads to the passage 95 in the relay valve device 5, thereby increasing the pressure of the fluid in the chamber 165 of the fluid pressure operated switch device 7, thus causing the diaphragm 163 to move downwardly so as to move the stem 170 into engagement with the contact 178, and thus establish a circuit through the winding of the application magnet valve device 11 so as to cause this magnet valve device to again supply fluid from the reservoir 19 to the control pipe 17. In addition, the pressure of the fluid in the chamber 93 of the relay valve device 5 will be increased and this valve will be caused to operate to supply fluid to the control pipe 17. This increase in the pressure of the fluid in the control pipe 17 results in an increase in the pressure of the fluid in the chamber 188 of the relay valve device 9, and causes this valve device to again operate to supply fluid under pressure to the brake cylinder 14.

When the desired degree of brake application has been secured the operating handle 42 of the engineer's brake valve is returned to the lap position so as to cut off the supply of fluid under pressure to the chamber 93 of the relay valve device 5, and to the chamber 165 of the fluid pressure operated switch device 7, and when the pressure of the fluid in the control pipe 17 increases to a sufficient value, the relay valve device 5 and the fluid pressure operated switch device 7 will again move to the lap position.

If it is desired to effect an emergency application of the brakes the handle 42 of the engineer's brake valve is turned to the emergency position, in which position the ports in the rotary valve 37 establish communication between the chamber 39 and the port 35, which has the pipe 36 connected thereto, this communication not having a choke therein as does the port through which communication between these points is established in the service position of the engineer's brake valve.

In addition, when the handle 42 is turned to the emergency position the rotary valve 37 cuts off communication between the chamber 39 and the port 31 leading to the brake pipe 18, and the ports in the rotary valve 37 establish communication between the port 31 and the atmospheric exhaust port 33 so as to release fluid from the brake pipe 18.

On a reduction in the pressure of the fluid in the brake pipe 18 there will be a similar reduction in the pressure of the fluid in the chamber 66 of the fluid pressure operated valve device 3, and the piston 65, being subject on the opposite side to main reservoir pressure in the valve chamber 70 will be moved to the left as viewed in Fig. 1 of the drawings, against the spring 88, and the stem 87 will move the slide valve 74 on the valve seat 75 so that the cavity 77 in the slide valve no longer establishes communication between the ports 79 and 80, and so that the end of the slide valve 74 uncovers the port 84, with the result that fluid under pressure will flow from the main reservoir by way of the pipe 72 to the valve chamber 70 and therefrom through the restricted passage 86 and the port 84 to the pipe 82 leading to the relay valve device 5.

During the time interval after the handle 42 has been moved to the emergency position and before the piston 65 is moved to the left as viewed in Fig. 1 of the drawings, fluid under pressure will flow through the brake valve device 1 to the pipe 36 and therefrom to the port 79 and the cavity 77 to the passage 80 and therethrough to the pipe 82, but on movement of the piston 65 as a result of the reduction in pressure of the fluid in the brake pipe, the supply of fluid to the pipe 82 from the pipe 36 will be cut off, and fluid will thereafter be supplied to the pipe 82 from the valve chamber 70.

The rate of flow of fluid to the pipe 82 and therefrom to the chamber 93 in the relay valve device 5 and the chamber 165 in the fluid pressure operated switch device 7 is somewhat more rapid through the choke 86 than through the port in the rotary valve 37 through which fluid is supplied to the pipe 82 when the engineer's brake valve 1 is in the service position. This results in a more rapid increase in the pressure of the fluid in the relay valve device 5, and in the fluid pressure operated switch device 7, than occurs during a service application of the brakes so that these devices are very quickly conditioned to increase the pressure of the fluid in the control pipe 17 and thus effect an application of the brakes.

In addition, on the reduction in the pressure of the fluid in the brake pipe 18, the pressure of the fluid in the valve chamber 320 of the change-over valve device 20 will be reduced after a time interval determined by the time required for the fluid in the valve chamber and in the pressure chamber 325 to escape through the choke 322.

On a reduction in the pressure of the fluid in the valve chamber 320 the piston stem 328 will be forced downwardly by the springs 334 and 335, and the slide valve 327 will be moved to the position in which communication is cut off between the passages 341 and 342 and communication is established between the passages 345 and 342 with the result that fluid is supplied from the supply reservoir 15 to the chamber 188 of the relay valve device 9.

In this position of the change-over valve device fluid may also be supplied to the chamber 188 from the control pipe 17 by way of the passage 189 and past the check valve 190, but the release of fluid from the chamber 188 through the control pipe will be cut off by the check valve 190 and by the slide valve 327 which cuts off communication between the passages 341 and 342 and thereby through the passage which bypasses the check valve 190.

An emergency application of the brakes may also be effected by means of the conductor's brake valve 2, by turning the lever 58 which causes the cam surface 59 to press upon the end of the lever 57, thereby forcing the stem 55 downwardly and moving the valve 59 away from the seat rib 51, thus permitting fluid to escape from the brake pipe 18 by way of the pipe 48.

The consequent reduction in the pressure of the fluid in the brake pipe 18, which will take place even though the engineer's brake valve 1 is in the release or lap position, in which position fluid is supplied to the brake pipe at a rate less rapid than the rate at which fluid is vented from the brake pipe 18 by means of the conductor's brake valve, causes the piston 65 of the fluid pressure operated valve device 3 to be moved to the emergency position and supply fluid under pressure to the pipe 82 to effect an application of the brakes.

In addition, as a result of the reduction in the pressure of the fluid in the brake pipe which is produced by operation of the conductor's valve, the change-over valve device 20 operates as described above to supply fluid from the reservoir 15 to the chamber 188 of the relay valve device and thereby produce an application of the brakes.

In order to effect a release of the brakes after an application the handle 42 of the engineer's brake valve 1 is turned to the release position, in which position the ports in the rotary valve 37 establish communication between the chamber 39 and the brake pipe 18 so as to reestablish the pressure of the fluid in the brake pipe, if there has been a reduction in the pressure of the fluid in this pipe, and at the same time the ports in the rotary valve 37 establish communication between the port 35 leading from the pipe 36, and the atmospheric exhaust port 33.

When the port 35 is connected to the atmospheric exhaust port 33 fluid under pressure is permitted to flow from the pipe 36 to the atmosphere, and as the pipe 36 is in communication with the pipe 82 and the passage 95 of the relay valve device 5 by way of the cavity 77 in the slide valve 74 of the fluid pressure operated valve device 3, fluid will flow from the passage 95 to the atmosphere.

If, at the time the engineer's brake valve 1 is turned to the release position, the slide valve 74 is not in the position in which the cavity 77 establishes communication between the ports 79 and 80, it will be moved to this position as soon as the pressure of the fluid in the brake pipe 18 is reestablished.

On the release of fluid under pressure from the passage 95 fluid will be released from the chamber 165 in the fluid pressure operated switch device 7, and on a reduction in the pressure of the fluid in the chamber 165 the diaphragm 163 will be moved upwardly by the pressure of the fluid in the chamber 168 on the lower side thereof, and the stem 170 will be moved into engagement with the contact 175, thereby establishing a circuit through the wire 177 which leads to the winding of the release magnet valve device 12.

On energization of the winding of the release magnet valve device 12 the double beat valve element 296 associated with this valve device is moved downwardly to cut off communication between the chamber 295 and the chamber 299, and to permit communication between the chamber 295 and the chamber 303, which is connected to the atmosphere. This permits fluid to flow from the chamber 287 on the upper side of the valve 282, to the chamber 295 by way of the passage 298 and therefrom to the atmosphere.

On the consequent reduction in the pressure of the fluid in the chamber 287 the pressure of the fluid in the chamber 280 acting on the portion of the valve 282 outwardly of the seat rib 284 forces the valve 282 upwardly against the spring 285 and away from the seat rib 284 to permit fluid to flow from the chamber 280 to the chamber 290, and therefrom to the atmosphere by way of the passage 292 having the choke 293 interposed therein.

The chamber 280 is connected to the control pipe 17 by way of the passage 281, so that on the release of fluid from the chamber 280 fluid will be released from the control pipe 17.

On the release of fluid under pressure from the passage 95 in the relay valve device 5, fluid will also be vented from the chamber 93 and the piston 92 will be moved to the left by the fluid under pressure in the valve chamber 98 so that the stem 106 moves the slide valve 100 to the position in which it is shown in Fig. 1 of the drawings, in which position communication is established by way of the port 107 through the slide valve 100 with the port 102 in the slide valve seat, and between the valve chamber 98 and the port 103 so that fluid is released from the slide valve chamber 98 to the atmosphere, while the valve element 111 and the pilot valve 120 are permitted to move to their seats if they are not already in engagement therewith.

On the release of fluid under pressure from the valve chamber 98 fluid is vented from the passage 132 and from the control pipe 17.

If the handle 42 of the engineer's brake valve 1 is left in the release position, all of the fluid in the pipe 36, and in the passage 95, will be vented to the atmosphere so that substantially no fluid under pressure will be present in the chamber 165 of the switch device 7 or in the chamber 93 of the relay valve device 5.

The pressure of the fluid in the control pipe 17 will continue to reduce until it is reduced a value substantially equal to that in the chamber 93 of the relay valve device 5 and the chamber 165 of the switch device 7. When the pressure of the fluid in the chamber 168 is reduced to a value substantially equal to that in the chamber 165 on the opposite side of the diaphragm 163 the diaphragm is held in the position in which the stem 170 is out of engagement with the contact 178 and in engagement with the contact 175, thereby interrupting the circuit to the winding of the application magnet valve device 11 and maintaining a circuit through the winding of the release magnet valve device 12. The control pipe 17 therefore will be connected to the atmosphere by way of the valve chamber 98 and the ports 102 and 103, and by way of the release magnet valve device 12.

On the release of fluid under pressure from the control pipe 17 fluid will be released from the chamber 188 on the upper side of the piston 186 of the relay valve device 9, and this piston will thereupon be forced upwardly by the pressure of the fluid in the slide valve chamber 191 on the lower side of the piston 186, thus causing the slide valve 192 to be moved to a position to uncover the exhaust passage 195, and permit fluid to escape from the brake cylinder 14 to the atmosphere by way of the pipe and passage 216, the slide valve chamber 191, and the atmospheric passage 195. This effects a release of the brakes.

After an emergency application of the brakes the release of fluid from the control pipe 17 is not effective to release fluid from the chamber 188 of the relay valve device 9 until the pressure of the fluid in the brake pipe is restored, which effects an increase in the pressure of the fluid in the valve chamber 320 of the change-over valve device 20, causing the slide valve 327 thereof to be moved to a position to again establish communication through the passage which by-passes the check valve 190. Fluid will thereupon flow from the chamber 188 to the control pipe 17 or to the release magnet valve device 12.

It will be seen that in the braking system provided by this invention the application magnet valve device 11 supplies fluid under pressure to the control pipe from a reservoir separate from the reservoir from which fluid under pressure is supplied to the brake cylinder 14. The supply reservoir 15, therefore, will not be depleted as a result of improper operation of the application magnet valve device 11 or as a result of the rupture of the control pipe 17.

It will be seen also that the control reservoir 19 from which fluid under pressure is supplied to the control pipe 17 by means of the application magnet valve device 11 is charged from the brake pipe 18 through a choke or restricted portion 238, and the rate of flow of fluid from the brake pipe to the control reservoir 19 is relatively low, and hence on a reduction in the pressure of the fluid in the reservoir 19 as a result of operation of the application magnet valve device 11 fluid will not be taken from the brake pipe 18 rapidly enough to produce a sufficient reduction in the pressure of the fluid in the brake pipe to effect operation of the change-over valve device 20 which is responsive to the pressure of the fluid therein. This eliminates the possibility of an undesired application of the brakes as a result of a reduction in brake pipe pressure caused by the flow of fluid to the reservoir 19.

In Fig. 3 of the drawings I have illustrated a modified form of the braking system embodying my invention. The system illustrated in this figure of the drawings is generally similar to that shown in Fig. 1 of the drawings, and identical reference characters are employed for the elements of the system which are identical with those employed in the system shown in Fig. 1.

The system shown in this figure of the drawings differs from that shown in Fig. 1 of the drawings in that in place of the reservoir 19, which is charged from the brake pipe 18 in the system shown in Fig. 1 of the drawings, a separate reservoir 351 is employed which is charged from a separate supply line 350 which extends throughout the length of the train and which may be supplied with fluid under pressure from a suitable source, such as the main reservoir 4 employed in the system shown in Fig. 1.

The reservoir 351 is charged with fluid under pressure from the pipe 350 by way of a pipe 352 having interposed therein a choke or restricted portion 354, and a check valve 355, which is adapted to permit fluid to flow from the pipe 350 to the reservoir 351 and to cut off the flow of fluid in the opposite direction.

The application magnet valve device 11 is supplied with fluid under pressure from the reservoir 351 by way of a pipe 358 which corresponds to the pipe 258 in the system shown in Fig. 1 of the drawings.

The operation of the system shown in Fig. 3 of the drawings is generally similar to that shown in Fig. 1 of the drawings and will not be described in detail.

It will be seen that in each of the systems shown in this application a source of fluid under pressure separate from that from which fluid is supplied to the brake cylinder 14 is provided, and from which the application magnet valves employed in these systems supply fluid under pressure to the control pipe. It will be seen, therefore, that in each of these systems the source of fluid employed to effect an application of the brakes will not be depleted as a result of improper operation of the application magnet valve devices or of rupture of the control pipe.

While a preferred embodiment and one modification of the braking system embodying my invention has been illustrated and described in detail, it should be understood that this invention is not limited to these details of construction, and that numerous changes and modifications may be made without departing from the scope of the following claims.

Having now described my invention, what I claim as new and desire to secure by Letters Patent, is:

1. In a fluid pressure braking system, in combination, a brake cylinder, a supply reservoir, a control reservoir, a brake pipe, a relay valve device operated by an increase in fluid pressure for supplying fluid under pressure from the supply reservoir to the brake cylinder, means for supplying fluid under pressure from the control reservoir to the relay valve device, means for supplying fluid under pressure to the control reservoir from the brake pipe, and means to control the rate of flow of fluid from the brake pipe to the control reservoir.

2. In a fluid pressure braking system, in combination, a brake cylinder, a supply reservoir, a control reservoir, a brake pipe, a relay valve device operated by an increase in fluid pressure for supplying fluid under pressure from the supply reservoir to the brake cylinder, manually controlled valve means for effecting supply of fluid under pressure to the relay valve device, electroresponsive means for supplying fluid under pressure from the control reservoir to the relay valve device, and means for supplying fluid under pressure to the control reservoir from the brake pipe.

3. In a fluid pressure braking system, in combination, a brake cylinder, a supply reservoir, a control reservoir, a brake pipe, a supply pipe, a relay valve device operated by an increase in fluid pressure for supplying fluid under pressure from the supply reservoir to the brake cylinder, valve means for supplying fluid under pressure from the control reservoir to the relay valve device, manually operable means for supplying fluid under pressure to the relay valve device, and means for supplying fluid under pressure from the supply pipe to the control reservoir.

4. In a fluid pressure braking system, in combination, a brake cylinder, a supply reservoir, a control reservoir, a brake pipe, a supply pipe, a relay valve device operated by an increase in fluid pressure for supplying fluid under pressure from the supply reservoir to the brake cylinder, manually controlled valve means for supplying fluid under pressure to the relay valve device, electroresponsive means for supplying fluid under pressure from the control reservoir to the relay valve device, and means for supplying fluid under pressure from the supply pipe to the control reservoir.

5. In a fluid pressure braking system, in combination, a brake cylinder, a supply reservoir, a control reservoir, a brake pipe, a supply pipe, a relay valve device operated by an increase in fluid pressure for supplying fluid under pressure from the supply reservoir to the brake cylinder, valve means for supplying fluid under pressure from the control reservoir to the relay valve device, manually operable means for supplying fluid under pressure to the relay valve device, means for supplying fluid under pressure from the supply pipe to the control reservoir, and means to cut off the flow of fluid from the control reservoir to the supply pipe.

6. In a fluid pressure braking system, in combination, a brake cylinder, a supply reservoir, a control reservoir, a brake pipe, a control pipe, a relay valve device operated by an increase in fluid pressure in the control pipe for supplying fluid under pressure from the supply reservoir to the brake cylinder, manually controlled valve means for effecting supply of fluid under pressure to the control pipe, and electroresponsive means for supplying fluid under pressure to the control pipe from the control reservoir.

7. In a fluid pressure braking system, in combination, a brake cylinder, a supply reservoir, a control reservoir, a brake pipe, a control pipe, a relay valve device operated by an increase in fluid pressure in the control pipe for supplying fluid under pressure from the supply reservoir to the brake cylinder, manually controlled valve means for effecting supply of fluid under pressure to the control pipe, electroresponsive means for supplying fluid under pressure to the control pipe from the control reservoir, and means for supplying fluid under pressure to the control reservoir from the brake pipe.

8. In a fluid pressure braking system, in combination, a brake cylinder, a supply reservoir, a control reservoir, a brake pipe, a control pipe, a relay valve device operated by an increase in fluid pressure in the control pipe for supplying fluid under pressure from the supply reservoir to the brake cylinder, manually controlled valve means for effecting supply of fluid under pressure to the control pipe, electroresponsive means for supplying fluid under pressure to the control pipe from the control reservoir, means for supplying fluid under pressure to the control reservoir from the brake pipe, and means for controlling the rate of flow of fluid to the control reservoir from the brake pipe.

9. In a fluid pressure brake equipment, in combination, a brake cylinder, a brake pipe, a supply reservoir, a control reservoir, a relay valve device operative on an increase in the pressure of the fluid supplied thereto to supply fluid under pressure from the supply reservoir to the brake cylinder, valve means for supplying fluid under pressure from the control reservoir to the relay valve device, a valve device subject to and operated upon a reduction in the pressure of the fluid in the brake pipe to supply fluid under pressure to the relay valve device, means for supplying fluid under pressure from the brake pipe to the control reservoir, and means to control the rate of flow of fluid from the brake pipe to the control reservoir.

10. In a fluid pressure brake equipment, in combination, a brake cylinder, a brake pipe, a supply reservoir, a control reservoir, a relay valve device operative on an increase in the pressure of the fluid supplied thereto to supply fluid under pressure from the supply reservoir to the brake cylinder, valve means for supplying fluid under pressure from the control reservoir to the relay valve device, a valve device subject to and operated on a reduction in the pressure of the fluid in the brake pipe to supply fluid under pressure from the supply reservoir to the relay valve device, means for supplying fluid under pressure from the brake pipe to the control reservoir, and means to control the rate of flow of fluid from the brake pipe to the control reservoir.

11. In a fluid pressure brake equipment, in combination, a brake cylinder, a brake pipe, a supply pipe, a supply reservoir, a control reservoir, a relay valve device operative on an increase in the pressure of the fluid supplied thereto to supply fluid under pressure from the supply reservoir to the brake cylinder, valve means for supplying fluid under pressure from the control reservoir to the relay valve device, a valve device subject to and operated on a reduction in the pressure of the fluid in the brake pipe to supply fluid under pressure to the relay valve device, and means for supplying fluid under pressure from the supply pipe to the control reservoir.

12. In a fluid pressure brake equipment, in combination, a brake cylinder, a brake pipe, a local supply reservoir, a local control reservoir, a relay valve device operative on an increase in the pressure of the fluid supplied thereto to supply fluid under pressure from the supply reservoir to the brake cylinder, manually controlled valve means for supplying fluid under pressure to the relay valve device, valve means for supplying fluid under pressure from the control reservoir to the relay valve device, and a valve device subject to and operated on a reduction in the pressure of the fluid in the brake pipe for supplying fluid under pressure to the relay valve device.

13. In a fluid pressure brake equipment, in combination, a brake cylinder, a brake pipe, a local supply reservoir, a local control reservoir, a relay valve device operative on an increase in the pressure of the fluid supplied thereto to supply fluid under pressure from the supply reservoir to the brake cylinder, manually controlled valve means for supplying fluid under pressure to the relay valve device, valve means for supplying fluid under pressure from the control reservoir to the relay valve device, and a valve device subject to and operated on a reduction in the pressure of the fluid in the brake pipe for supplying fluid under pressure from the supply reservoir to the relay valve device.

14. In a fluid pressure brake equipment, in combination, a brake cylinder, a brake pipe, a supply reservoir, a control reservoir, a relay valve device operative on an increase in the pressure of the fluid supplied thereto to supply fluid under pressure from the supply reservoir to the brake cylinder, manually controlled valve means for supplying fluid under pressure to the relay valve device, electroresponsive valve means for supplying fluid under pressure from the control reservoir to the relay valve device, and a valve device subject to and operated on a reduction in the pressure of the fluid in the brake pipe for supplying fluid under pressure to the relay valve device.

15. In a fluid pressure brake equipment, in combination, a brake cylinder, a brake pipe, a control pipe, a supply reservoir, a control reservoir, a relay valve operated on an increase in fluid pressure to supply fluid from the supply reservoir to the brake cylinder, a communication through which fluid under pressure may be supplied from the control pipe to the relay valve, a check valve operative to prevent flow of fluid from the relay valve to the control pipe through said communication, means for supplying fluid from the control reservoir to said control pipe, and changeover valve means responsive to the pressure of the fluid in the brake pipe for controlling a communication between the relay valve and the control pipe which by-passes said check valve.

16. A brake equipment as described in claim 15 and in which the changeover valve means also controls the supply of fluid from the supply reservoir to the relay valve.

17. A brake equipment as described in claim 15 and characterized by means for supplying fluid from the brake pipe to the control reservoir.

ELLIS E. HEWITT.